(12) United States Patent
Zhou et al.

(10) Patent No.: US 11,560,008 B2
(45) Date of Patent: Jan. 24, 2023

(54) PRINTED SUBSTRATE AND METHOD FOR PRINTING ONTO A SUBSTRATE

(71) Applicant: RICOH COMPANY, LTD., Tokyo (JP)

(72) Inventors: Yuanyuan Zhou, Shropshire (GB); Andrew McVitie, Shropshire (GB); Martin Ball, Shropshire (GB)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/414,082

(22) PCT Filed: Dec. 18, 2019

(86) PCT No.: PCT/JP2019/049697
§ 371 (c)(1),
(2) Date: Jun. 15, 2021

(87) PCT Pub. No.: WO2020/130052
PCT Pub. Date: Jun. 25, 2020

(65) Prior Publication Data
US 2022/0032675 A1    Feb. 3, 2022

(30) Foreign Application Priority Data

Dec. 21, 2018  (GB) ...................... 1821085

(51) Int. Cl.
*B41M 5/52*    (2006.01)
*B41M 7/00*    (2006.01)
(Continued)

(52) U.S. Cl.
CPC .......... *B41M 5/5254* (2013.01); *B41J 2/2114* (2013.01); *B41M 5/0011* (2013.01);
(Continued)

(58) Field of Classification Search
CPC ..... C09D 11/326; C09D 11/107; C09D 11/03; C09D 11/037; C09D 11/033; C09D 11/36;
(Continued)

(56) References Cited

U.S. PATENT DOCUMENTS 3,464,934 A * 9/1969 Gordon .................... D06N 3/08
521/88
3,870,591 A * 3/1975 Witman ............... D06N 7/0047
428/318.6

(Continued)

FOREIGN PATENT DOCUMENTS

CN    107709005    2/2018
GB    1 466 254    3/1977
(Continued)

OTHER PUBLICATIONS

Russian Office Action dated Dec. 22, 2021 for Russian Application No. 2021116830, with English translation, 14 pages.
(Continued)

*Primary Examiner* — Manish S Shah
(74) *Attorney, Agent, or Firm* — Grüneberg and Myers PLLC

(57) ABSTRACT

A printed substrate, wherein a printed polymer layer is present on a surface of the substrate, is disclosed. The printed polymer layer includes a polymer selected from group consisting of one or more of polyvinyl chloride, a copolymer of vinyl chloride and vinyl acetate, and a terpolymer of vinyl chloride, vinyl acetate and ethylene; a plasticizer; a colorant; and calcium carbonate.

13 Claims, 3 Drawing Sheets

(51) Int. Cl.
  *B41M 5/00* (2006.01)
  *B41J 2/21* (2006.01)
  *C09D 11/32* (2014.01)
  *C09D 11/36* (2014.01)
  *B41J 25/00* (2006.01)

(52) U.S. Cl.
  CPC ........ *B41M 5/0047* (2013.01); *B41M 5/5218* (2013.01); *B41M 7/009* (2013.01); *C09D 11/32* (2013.01); *C09D 11/36* (2013.01); *B41J 2025/008* (2013.01)

(58) Field of Classification Search
  CPC ......... C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41J 3/4078; B41J 11/021; B41J 11/002; B41J 25/001; B41J 25/34; B41J 25/003; B41J 2/21; B41J 25/312; B41J 2025/008; B41J 2202/21; B41J 2/17596; B41J 2/16508; B41J 2/1652; B41J 2/16538; B41J 2/175; B41J 2/17563; B41J 29/02; B41J 2/17513; B41J 2/17509; B41J 29/13; B41J 2/17553; B41J 2/1606; B41J 2/1642; B41J 2/1609; B41J 2/1433; B41J 2/164; B41J 2/162; B41J 2/161; B41J 2/19; B41J 15/04; B41J 2/1623; B41J 2202/00; B41J 2202/03; B41J 2/14201; B41J 2/045; B41J 11/00; B41J 2/04581; B41J 2/055; B41J 2002/16502; B41J 2/04588; B41J 2/04595; B41J 2/04586; B41J 2/14274; B41J 2/01; B41J 2/211; B41J 2/17; B41J 2/17593; B41J 2/2107; B41J 2/1755; B41J 2/2114; B41J 2/2117; B41J 2/2056; B41J 2/0057; B41J 3/60; B41J 2002/012; B41J 2/04598; B41F 23/042; B41F 23/0436; B41M 5/0011; B41M 5/0017; B41M 5/0023; B41M 5/0047; B41M 7/00; B41M 7/0072; B41M 5/52; B41M 5/5218; B41M 5/5227
  See application file for complete search history.

(56) References Cited

U.S. PATENT DOCUMENTS

| | | |
|---|---|---|
| 10,030,119 B2 | 7/2018 | Gourdin et al. |
| 10,487,455 B2 | 11/2019 | Moriya et al. |
| 2007/0062394 A1 | 3/2007 | Damewood |
| 2013/0293647 A1* | 11/2013 | Dannhauser ......... B41M 5/0017 347/102 |
| 2019/0375222 A1 | 12/2019 | Hamilton et al. |
| 2021/0016586 A1 | 1/2021 | Moriya et al. |

FOREIGN PATENT DOCUMENTS

| | | | |
|---|---|---|---|
| JP | 2-84600 A | 3/1990 | |
| JP | 10-259599 A | 9/1998 | |
| JP | 2001-271276 A | 10/2001 | |
| JP | 2015-117326 A | 6/2015 | |
| KR | 2001-0104503 A | 11/2001 | |
| RU | 2213011 | 9/2003 | |
| RU | 2395399 | 7/2010 | |
| WO | 99/06219 | 2/1999 | |
| WO | WO 2015/101569 A1 | 7/2015 | |
| WO | WO-2017001213 A1 * | 1/2017 | ............ B32B 27/08 |
| WO | WO 2017/090222 A1 | 6/2017 | |
| WO | WO 2018/110518 A1 | 6/2018 | |
| WO | WO 2020/054646 A1 | 3/2020 | |

OTHER PUBLICATIONS

International Search Report and Written Opinion dated Apr. 6, 2019 in PCT/JP2019/049697 filed on Dec. 18, 2019.
Chinese Office Action dated Mar. 21, 2022 in Chinese Application No. 201980083243.7, 7 pages.

* cited by examiner

[Fig. 1]
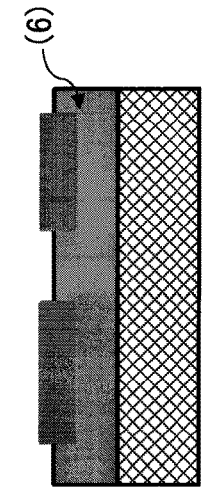
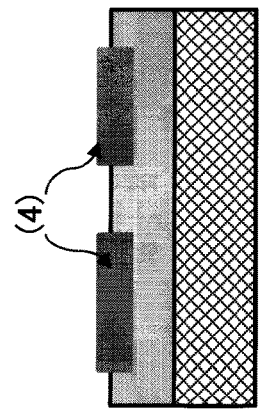
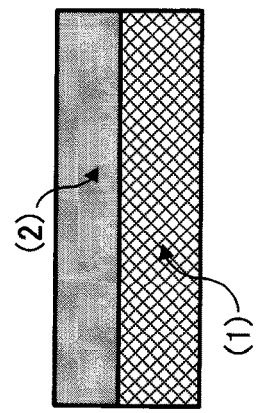

[Fig. 2]
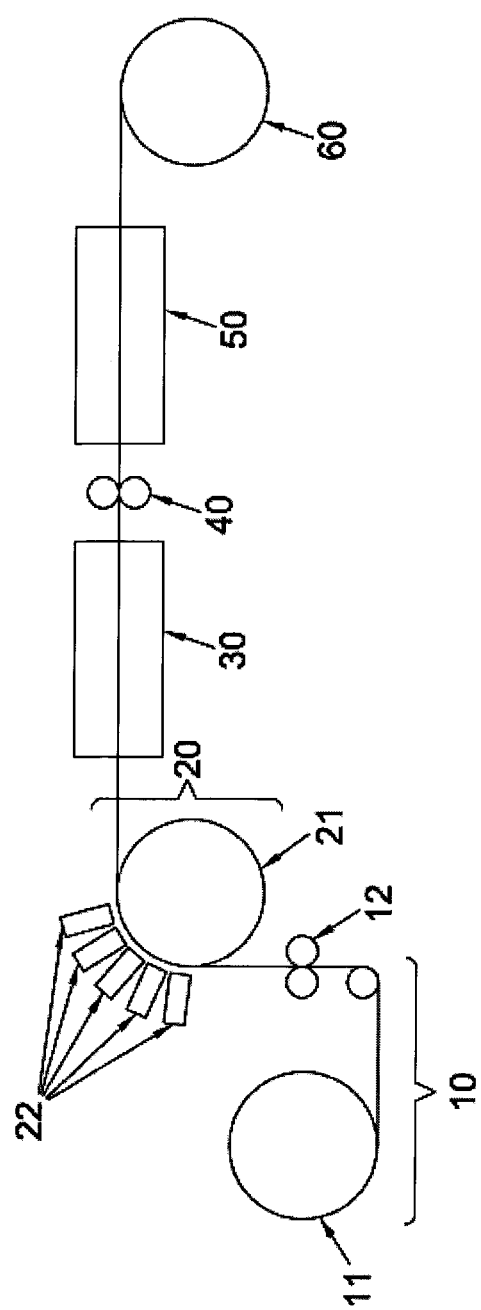

[Fig. 3]
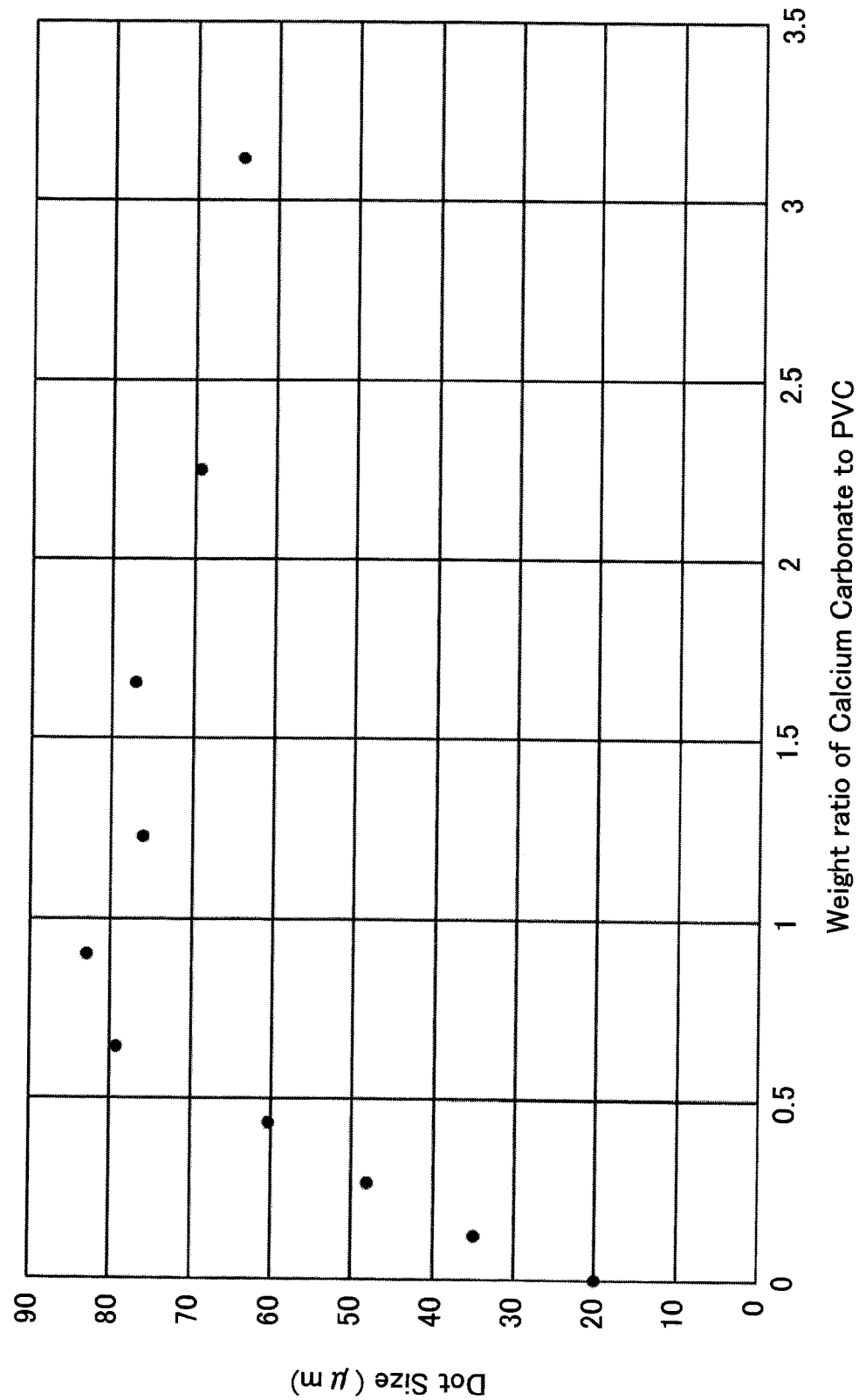

PRINTED SUBSTRATE AND METHOD FOR PRINTING ONTO A SUBSTRATE

TECHNICAL FIELD

The present invention relates to a printed substrate and to a method for printing onto a substrate. The present invention further relates to a plastisol composition that can be used in the method of the invention and can be used to prepare the printed substrate of the invention.

BACKGROUND ART

Inkjet printing is used in a variety of printing applications, and can provide high resolution coloured images on a range of substrates. Advantageously, the inkjet printing process provides high quality images. The process should achieve high optical density such that the amount of ink required to achieve the desired image is minimised.

In recent years, inkjet printing has been used in the production of wallpaper. In addition to a printed pattern, wallpaper typically has a resin layer that provides scratch and stain resistance and that also affects the appearance of the wallpaper. WO 2018/110518 describes a printing method that can be used to prepare surface coverings such as wallpaper. In the disclosed method, a liquid resin layer is applied to a substrate and a pattern is applied to the liquid resin layer by inkjet printing. The liquid resin layer with the pattern then undergoes curing such that the liquid resin layer undergoes a phase transition from liquid to solid. In the examples, a liquid plastisol resin layer composition is applied to fleece-backed paper. The plastisol composition is a dispersion of polyvinyl chloride polymer in an ester-based plasticiser.

CITATION LIST

Patent Literature

[PTL 1] WO 2018/110518

SUMMARY OF INVENTION

Technical Problem

The intensity of the printed image that results from the application of the inkjet ink to the liquid resin layer is affected by the interaction of the liquid resin layer and the ink. The dot gain, which is a measure of how far the ink drop spreads out when it hits the substrate, can vary depending upon this interaction. Dot gain is significant because too much dot gain will lead to an image that is not sharp, and the print may be darker than intended. Too little dot gain can result in decreased optical density. Control of dot gain is an important consideration in any inkjet printing process.

The present inventors have sought to make further improvements to printed substrates and to printing processes. In particular, the present inventors have sought to control dot gain and thereby improve optical density in printed substrates and printing processes.

Solution to Problem

Accordingly, the present invention provides a printed substrate, wherein a printed polymer layer is present on a surface of the substrate;
wherein the printed polymer layer comprises:
(a) a polymer chosen from one or more of polyvinyl chloride, a copolymer of vinyl chloride and vinyl acetate, and a terpolymer of vinyl chloride, vinyl acetate and ethylene;
(b) a plasticizer;
(c) a colorant; and
(d) calcium carbonate;
wherein the weight ratio of calcium carbonate to polymer in the printed polymer layer is in the range of 0.1 to 3.5.

The present invention further provides a method for printing onto a substrate, comprising steps of
applying a dispersion of polymer particles in a liquid plasticizer to a substrate to form a polymer layer, wherein the polymer is chosen from one or more of polyvinyl chloride, a copolymer of vinyl chloride and vinyl acetate, and a terpolymer of vinyl chloride, vinyl acetate and ethylene;
printing an ink onto the polymer layer to form a printed polymer layer, wherein the ink comprises a colorant and thereby the printed polymer layer comprises the colorant; and
curing the printed polymer layer to change the printed polymer layer from liquid to solid;
wherein the dispersion of polymer particles in a liquid plasticizer comprises calcium carbonate, such that the weight ratio of calcium carbonate to polymer is in the range of 0.1 to 3.5.

The present invention yet further provides a plastisol composition wherein polymer particles are dispersed in a liquid plasticizer,
wherein the polymer is chosen from one or more of polyvinyl chloride, a copolymer of vinyl chloride and vinyl acetate, and a terpolymer of vinyl chloride, vinyl acetate and ethylene,
wherein the composition comprises calcium carbonate such that the weight ratio of calcium carbonate to polymer in the plastisol composition is in the range of 0.1 to 3.5.

The inventors have surprisingly found that if the weight ratio of calcium carbonate to polymer in the polymer dispersion (and thus in the printed polymer layer) is within the range of 0.1 to 3.5, then the dot gain can be controlled and effective optical density can result. Thus, the printed image on the printed substrate of the invention may be sharper, and/or less ink can be used to provide the printed image.

BRIEF DESCRIPTION OF DRAWINGS

FIG. 1 schematically depicts an example method of printing onto a substrate of the present invention.
FIG. 2 schematically depicts an example apparatus for inkjet printing.
FIG. 3 illustrates how the dot size varies with the ratio of calcium carbonate to polymer in the examples and comparative examples of the invention.

DESCRIPTION OF EMBODIMENTS

In the printed substrate of the invention, a printed polymer layer is present on a surface of the substrate. The substrate may be formed of paper, non-woven fabric, plastic, wood, metal or combinations of these materials. Specific examples may be selected from natural paper, plastic film, synthetic paper, non-woven fabric, fleece, cloth, wood, semi-cure wallpaper (in which a solid resin layer is present in the form of a semi-gel), full-cure wallpaper, metal sheet, and metal thin film or any combination of these materials. In a preferred embodiment, the substrate comprises a fleece-backed paper.

The printed polymer layer may be present across the entirety of a surface of the substrate, but may also be present on a portion of the surface only. The substrate suitably has a substantially flat surface so that a specific distance between an inkjet head and the surface of the substrate can be maintained during printing.

The printed polymer layer comprises a polymer chosen from one or more of polyvinyl chloride, a copolymer of vinyl chloride and vinyl acetate, and a terpolymer of vinyl chloride, vinyl acetate and ethylene. In a preferred embodiment the polymer is polyvinyl chloride. Suitably, the amount of polymer in the printed polymer layer is from 25 wt % to 65 wt % based upon the weight of the polymer layer, preferably from 25 wt % to 55 wt % and more preferably from 30 wt % to 50 wt %.

The printed polymer layer comprises a plasticizer. A plasticizer is a material that, when added to a polymer, makes it softer or more pliable. The plasticizer reduces interactions between the polymer chains. Plasticizer compounds are typically non-volatile materials that have good compatibility with the polymer. In a preferred embodiment, the plasticizer is an ester-based plasticizer. Preferably the ester-based plasticizer is a phthalate-based plasticizer chosen from one or more of dibutyl phthalate, dinonyl phthalate, dioctyl phthalate, dodecyl phthalate, diisodecyl phthalate, diisononyl phthalate, ditridecyl phthalate, and n-hexyl-n-decyl phthalate. Suitably, the amount of plasticizer in the printed polymer layer is from 5 wt % to 35 wt % based upon the weight of the polymer layer, preferably from 10 wt % to 30 wt % and more preferably from 15 wt % to 25 wt %.

The polymer and plasticizer may have been applied to the substrate as a plastisol composition. A plastisol composition is a dispersion of polymer particles in a liquid plasticizer. The plastisol composition may be cured by the application of heat. Upon curing, the polymer particles absorb plasticizer, swell, and ultimately fuse with other polymer particles. Typically, the printed polymer layer will consist of a homogeneous coalesced mass of polymer, wherein the plasticizer is intimately mixed with the polymer.

The printed polymer layer comprises a colorant. Typical examples of the colorant include carbon black; any type of pigment such as azo pigments, phthalocyanine pigments, quinacridone pigments, quinophthalone pigments, nitroso pigments, nitro pigments, vat-dye pigments, mordant-dye pigments, basic-dye pigments, acid-dye pigments, and natural-dye pigments; and oil-soluble dyes such as diazo dyes and anthraquinone dyes.

Each of these dyes and pigments can be used alone or in combination with others. The amount of colorant in the printed polymer layer is suitably chosen based upon the requirements of the printed image and can vary widely. However, in many typical applications the amount of colorant in the printed polymer layer is from 1 wt % to 5 wt % based upon the weight of the polymer layer.

The colorant is typically an inkjet-printed colorant. Inkjet-printed colorant in the printed polymer layer of the present invention is typically present in a dot pattern (e.g. with a dot size of 30 μm to 85 μm), which is a characteristic of inkjet printing processes.

A distinction can be drawn between arrangements in which the colourant is within the polymer layer, and arrangements in which the colourant is external to the polymer layer. Typically, in the present invention, the colourant is within the printed polymer layer. This arrangement can be achieved by printing the colourant into the polymer layer before the polymer has been cured, and subsequently curing to form the polymer layer, with the colourant within the polymer layer. This is in contrast to arrangements in which a colourant is external to a polymer layer, such arrangements typically arising when a polymer layer is formed without a colorant, and an ink comprising a colourant is subsequently printed onto the surface of the polymer layer, where it remains external to the polymer layer.

The printed polymer layer comprises calcium carbonate. The weight ratio of calcium carbonate to polymer in the printed polymer layer is in the range of 0.1 to 3.5, preferably is in the range of 0.4 to 3.5 and more preferably is in the range of 0.4 to 1.5. The present inventors have found that a printed polymer layer having this ratio of calcium carbonate to polymer has a dot gain that equates to effective optical density of the printed image. If the calcium carbonate is outside of this range, the dot size is typically too low, which can result in decreased image density. The preferred dot size achieved on the printed substrate is from 30 μm to 85 μm. The dot size can be measured using any conventional method.

The type of calcium carbonate used in the invention is not limited, e.g. precipitated calcium carbonate or ground calcium carbonate may be used. In a preferred embodiment the calcium carbonate has an average particle size in the range of from 1 μm and 10 μm. The average particle size is suitably the D50 value, i.e. the mass median diameter.

The printed polymer layer may comprise additional fillers that are not calcium carbonate. Such fillers might include talc (magnesium silicate), barytes (barium sulphate), mica (aluminium sulphate), alumina and other aluminium based minerals. In a preferred embodiment, the printed polymer layer does not comprise any fillers apart from calcium carbonate.

The printed polymer layer may comprise further components such as whitening agents (typically titanium dioxide), surfactants (e.g. a viscosity depressant such as Viscobyk 5125), stabilisers (e.g. a Ba/Zn compounds such as Adecastab FL-115), blowing agents (e.g. azodicarbonamide) and optical brighteners (e.g. those available as Uvitex™ or Tinopal™). Blowing agents such as azodicarbonamide can have a yellowing effect, so it is often preferred to add a whitening agent such as titanium dioxide when the printed polymer layer comprises the blowing agent.

The method of the invention is for printing onto a substrate. The substrate may be formed of paper, non-woven fabric, plastic, wood, metal or combinations of these materials. Specific examples may be selected from natural paper, plastic film, synthetic paper, non-woven fabric, fleece, cloth, wood, semi-cure wallpaper (in which a solid resin layer is present in the form of a semi-gel), full-cure wallpaper, metal sheet, and metal thin film or any combination of these materials. In a preferred embodiment, the substrate comprises a fleece-backed paper.

The method of the invention may comprise a further step, before the dispersion is applied to a substrate, wherein the substrate is pre-treated. Such a pre-treatment step could include cleaning of the substrate (e.g. wiping with a cloth or by application of a cleaning liquid) or smoothing of the surface of the substrate (e.g. sanding with an abrasive material such as sandpaper). For example, a sheet metal substrate may be degreased, a polymer film substrate may be corona or plasma treated, or a wooden substrate may be cleaned to remove dust before the polymer dispersion is applied.

A dispersion of polymer particles in a liquid plasticizer is applied to the substrate to form a polymer layer. The dispersion may be applied across the entirety of a surface of the substrate, but may also be applied onto a portion of the surface only. The substrate suitably has a substantially flat surface so that a specific distance between an inkjet head and the surface of the substrate can be maintained during printing.

The dispersion of polymer particles in a liquid plasticizer is alternatively described as a plastisol composition. The dispersion is a two-phase system wherein polymer particles are dispersed throughout the liquid plasticizer. The polymer particles suitably have an average particle diameter of between 50 nm and 5000 nm, preferably between 100 nm and 2500 nm and more preferably between 100 nm and 1000 nm. A narrower particle size range is preferred as this is likely to improve the stability of the polymer layer (i.e. reducing the likelihood of the layer separating into different phases). The average particle diameter (suitably a volume average) may be measured by techniques such as laser diffraction, dynamic light scatting and single particle optical sizing. The amount of polymer particles per litre of dispersion is suitably from $10^4$ to $10^9$ particles. This may be measured by single particle optical sizing.

The polymer is chosen from one or more of polyvinyl chloride, a copolymer of vinyl chloride and vinyl acetate, and a terpolymer of vinyl chloride, vinyl acetate and ethylene. In a preferred embodiment the polymer is polyvinyl chloride.

In a preferred embodiment, the plasticizer is an ester-based plasticizer. Preferably the ester-based plasticizer is a phthalate-based plasticizer chosen from one or more of dibutyl phthalate, dinonyl phthalate, dioctyl phthalate, dodecyl phthalate, diisodecyl phthalate, diisononyl phthalate, ditridecyl phthalate, and n-hexyl-n-decyl phthalate.

The amount of polymer in the dispersion is suitably from 25 wt % to 65 wt % based upon the weight of the dispersion, preferably from 25 wt % to 55 wt % and more preferably from 30 wt % to 50 wt %. The amount of plasticizer in the dispersion is from 5 wt % to 35 wt % based upon the weight of the dispersion, preferably from 10 wt % to 30 wt % and more preferably from 15 wt % to 25 wt %.

The dispersion also comprises calcium carbonate, such that the weight ratio of calcium carbonate to polymer is in the range of 0.1 to 3.5, preferably is in the range of 0.4 to 3.5 and more preferably is in the range of 0.4 to 1.5. The present inventors have found that a dispersion having this ratio of calcium carbonate to polymer provides a printed polymer layer with a dot gain that equates to effective optical density of the printed image. If the calcium carbonate is outside of this range, the dot size is typically too low, which can result in decreased image density. The preferred dot size achieved during printing is from 30 μm to 85 μm. The dot size can be measured using any conventional method. Without wishing to be bound by theory, the present inventors speculate that that the amount of calcium carbonate in the dispersion affects the viscosity of the polymer layer on the substrate, which in turn affects the interaction of the inkjet ink and the polymer layer, and thus affects the dot gain.

The dispersion may comprise additional fillers that are not calcium carbonate. Such fillers might include talc (magnesium silicate), barytes (barium sulphate), mica (aluminium sulphate), alumina and other aluminium based minerals. In a preferred embodiment, the dispersion does not comprise any fillers apart from calcium carbonate.

The dispersion may comprise further components such as solvents (e.g. white spirit or Isopar from Exxon Mobil Chemical), whitening agents (typically titanium dioxide), surfactants (e.g. a viscosity depressant such as Viscobyk 5125), stabilisers (e.g. a Ba/Zn compounds such as Adecastab FL-115), blowing agents (e.g. azodicarbonamide) and optical brighteners (e.g. those available as Uvitex™ or Tinopal™). Blowing agents such as azodicarbonamide can have a yellowing effect, so it is often preferred to add a whitening agent such as titanium dioxide when the dispersion comprises the blowing agent.

The dispersion is applied by any suitable method. For example the dispersion could be applied by screen printing (flat-bed or rotary), roller coating with a metering roller or a doctor bar, gravure printing or coating line processes such as slot, extrusion, slide and curtain coating.

The thickness of the polymer layer is suitably from 5 to 100 microns, preferably from 12 to 50 microns.

An ink is printed onto the polymer layer to form a printed polymer layer. Suitably the printing is carried out by a droplet printing process, preferably inkjet printing. Any suitable inkjet printing apparatus could be used to print the printed polymer layer. For example, a RICOH Pro 4130 (trademark) wide format latex colour printer could be used. The inkjet print head is suitably heatable to control the viscosity of the inkjet inks. For example it may be heatable to a temperature in the range 30° C. to 60° C., most preferably around 45° C. Preferably, at least two colours are printed. In accordance with normal inkjet printing techniques, a first colour ink is applied first and at least a second colour ink is applied subsequently. Full colour inkjet printing may be used. Conventional black, cyan, magenta and yellow printing heads may be used.

The ink comprises a colorant. Typical examples of the colorant include carbon black, any type of pigment such as azo pigments, phthalocyanine pigments, quinacridone pigments, quinophthalone pigments, nitroso pigments, nitro pigments, vat-dye pigments, mordant-dye pigments, basic-dye pigments, acid-dye pigments, and natural-dye pigments; and oil-soluble dyes such as diazo dyes and anthraquinone dyes. Each of these dyes and pigments can be used alone or in combination with others.

An oil-based ink is suitably used. The oil-based ink comprises the colorant and preferably comprises a carrier such as an oily component. The oil-based ink may optionally include a binder resin. Preferably, the oily component is an ester oil. Suitable ester oils include phthalic acid esters such as dibutyl phthalate, dicapryl phthalate, diisodecyl phthalate, dioctyl phthalate (DPO), diisononyl phthalate, butyl-2-ethylhexyl phthalate, and di-2-ethylhexyl phthalate; adipic acid esters such as dioctyl adipate (diethylhexyl adipate: DOA) and diisononyl adipate (DINA); sebacic acid esters such as dibutyl sebacate, dioctyl sebacate, and diisononyl sebacate; citric acid esters such as acetyl tributyl citrate (ATBC); azelaic acid esters such as dibutyl azelate, dioctyl azelate, and diisononyl azelate; lauric acid esters such as methyl laurate, ethyl laurate, and isobutyl laurate; myristic acid esters such as isopropyl myristate, isocetyl myristate, and octyldodecyl myristate; palmitic acid esters such as isopropyl palmitate and octyl palmitate; octanoic acid esters such as cetyl octanoate, octyl octanoate (ethylhexyl ethylhexanoate: OOE), and isononyl octanoate; and isononanoic acid esters such as ethylhexyl isononanoate and isononyl isononanoate.

The viscosity of the oily component is preferably in the range from 5 mPas to 30 mPas, more preferably from 8 mPas to 18 mPas, most preferably from 10 mPas to 12 mPas at 45° C. Viscosity is preferably measured using a Brookfield DV-III Ultra Pro-grammable Rheometer.

It is preferred that the oil-based ink comprises less than 1% by weight and more preferably less than 0.1% by weight of volatile organic compound solvent. A volatile organic compound solvent is as defined by the EU Directive 1999/13/EC (Solvent Emissions Directive), an organic compound having at 293.15 K a vapour pressure of 0.01 kPa or more. Preferably, the oil-based ink is non-aqueous. Preferably, the content of water in the oil-based ink is less than 1% by weight, more preferably less than 0.1 weight percent, based upon the weight of the oil-based ink.

During the printing step, the ink is applied to the uncured polymer layer. The polymer layer is still liquid (because it has not been cured) and this provides effective dot gain, particularly when the weight ratio of calcium carbonate to polymer in the printed polymer layer is in the range of 0.1 to 3.5. During printing the colorant becomes an integral part of the polymer layer. The printing step is carried out before the curing step. If the polymer layer were cured before printing, then the ink would not interact appropriately with the polymer layer and the desired dot gain would not be achieved.

The printed polymer layer is cured to change the printed polymer layer from liquid to solid. Curing is achieved by heating the printed polymer layer, suitably at a temperature in the range 150 to 250° C., preferably at a temperature in the range 180 to 220° C. and most preferably in the range 190 to 210° C. Upon curing, the polymer particles in the polymer layer absorb plasticizer, swell, and ultimately fuse with other polymer particles. Typically, the printed polymer layer will consist of a homogeneous coalesced mass of polymer, wherein the plasticizer is intimately mixed with the polymer.

Further finishing steps may optionally be carried out after the curing step. Such finishing steps may include blowing, embossing, overcoating and/or laminating. The finishing steps may add decoration to the cured polymer layer, or may add extra protection.

The present invention yet further provides a plastisol composition that may be used in the method of the invention and may be used to provide a printed substrate of the invention. In the plastisol composition, polymer particles are dispersed in a liquid plasticizer.

The polymer is chosen from one or more of polyvinyl chloride, a copolymer of vinyl chloride and vinyl acetate, and a terpolymer of vinyl chloride, vinyl acetate and ethylene.

In a preferred embodiment, the plasticizer is an ester-based plasticizer. Preferably the ester-based plasticizer is a phthalate-based plasticizer chosen from one or more of dibutyl phthalate, dinonyl phthalate, dioctyl phthalate, dodecyl phthalate, diisodecyl phthalate, diisononyl phthalate, ditridecyl phthalate, and n-hexyl-n-decyl phthalate.

The amount of polymer in the plastisol composition is suitably from 25 wt % to 65 wt % based upon the weight of the composition, preferably from 25 wt % to 55 wt % and more preferably from 30 wt % to 50 wt %. The amount of plasticizer in the plastisol composition is from 5 wt % to 35 wt % based upon the weight of the composition, preferably from 10 wt % to 30 wt % and more preferably from 15 wt % to 25 wt %.

The plastisol composition also comprises calcium carbonate, such that the weight ratio of calcium carbonate to polymer is in the range of 0.1 to 3.5, preferably is in the range of 0.4 to 3.5 and more preferably is in the range of 0.4 to 1.5.

The plastisol composition may comprise additional fillers that are not calcium carbonate. Such fillers might include talc (magnesium silicate), barytes (barium sulphate), mica (aluminium sulphate), alumina and other aluminium based minerals. In a preferred embodiment, the plastisol composition does not comprise any fillers apart from calcium carbonate.

The plastisol composition may comprise further components such as solvents (e.g. white spirit or Isopar from Exxon Mobil Chemical), whitening agents (typically titanium dioxide), surfactants (e.g. a viscosity depressant such as Viscobyk 5125), stabilisers (e.g. a Ba/Zn compounds such as Adecastab FL-115), blowing agents (e.g. azodicarbonamide) and optical brighteners (e.g. those available as Uvitex™ or Tinopal™).

FIG. 1 schematically depicts an example of the method of the present invention. A dispersion of polymer particles is applied to a substrate (1) to form a polymer layer (2). A printed polymer layer (2, 4) is formed by printing (3) onto the polymer layer (2). The printed polymer layer is cured (5).

FIG. 2 schematically depicts an example apparatus for inkjet printing that may be used in the method of the invention. An unwinder roller 11 provides the substrate 10. The substrate 10 is fed to a screen coater 12 where a polymer layer is formed on the substrate 10. An inkjet printing station 20 comprising a drum 21 of diameter about 1 metre is used to print onto the polymer layer. Inkjet printing heads 22 are arranged around the drum.

The printed polymer layer is cured in the curing oven 30 by heating to a temperature in the range of 120-200° C., preferably 150° C. A surface finish may be applied to the printed polymer layer with a gravure coater/roller 40. The printed polymer layer may undergo further heating in the heating apparatus 50. The finished printed polymer layer may be wound onto a roller rewinder 60 for storage and further transportation. The following non-limiting examples are illustrative of the invention.

Examples

Preparation of Liquid Plastisol
The liquid plastisol was prepared by:
1) Mixing PVC and plasticizer.
2) Adding calcium carbonate to the mixture of the step 1.
3) Adding viscosity depressant to the mixture of step 2.
During steps 1 to 3, the mixing temperature was kept at between 21° C. to 25° C.

The composition of the different plastisol compositions is shown in Table 1 below. Two further commercial plastisol compositions (comparative examples 1 and 2) were also tested. The calcium carbonate used in the examples was Durcal™ 10.

TABLE 1

| | Amount of component in plastisol composition (wt %) | | | | Weight ratio of calcium carbonate to PVC |
|---|---|---|---|---|---|
| | PVC | Plasticiser | Calcium carbonate | Viscosity depressant | |
| Comparative Example 1 | 66.0 | 33.0 | 0 | 1.0 | 0 |
| Example 1 | 60.5 | 30.2 | 7.3 | 2.0 | 0.12 |
| Example 2 | 55.0 | 27.5 | 14.6 | 2.9 | 0.26 |
| Example 3 | 49.7 | 24.8 | 21.6 | 3.8 | 0.43 |
| Example 4 | 44.4 | 22.2 | 28.6 | 4.8 | 0.64 |
| Example 5 | 39.3 | 19.7 | 35.3 | 5.7 | 0.90 |
| Example 6 | 34.0 | 17.0 | 41.7 | 7.4 | 1.23 |
| Example 7 | 28.8 | 14.4 | 47.7 | 9.1 | 1.66 |
| Example 8 | 23.6 | 11.8 | 53.1 | 11.5 | 2.25 |

TABLE 1-continued

|  | Amount of component in plastisol composition (wt %) | | | | Weight ratio of calcium carbonate to PVC |
|---|---|---|---|---|---|
|  | PVC | Plasti-ciser | Calcium carbonate | Viscosity depressant | |
| Example 9 | 18.7 | 9.3 | 58.2 | 13.8 | 3.11 |
| Comparative Example 2 | 63.1 | 31.5 | 3.9 | 1.5 | 0.06 |
| Comparative Example 3 | 11.1 | 5.6 | 66.7 | 16.7 | 6.00 |

Printing

An image was printed using each of the plastisol compositions of the examples and comparative examples by 1) Applying the plastisol composition to the substrate to form a polymer layer.

2) Printing an ink including a colorant over the polymer layer from step 1.

3) Heating the printed polymer layer for 90 seconds at 130° C.

The polymer layer was not dried or cured between steps (1) and (2).

Evaluation

The dot gain was measured for each of the printed polymer layers formed using the plastisol compositions. The evaluation results are also shown in Table 2.

TABLE 2

|  | Dot Size (μm) | Evaluation |
|---|---|---|
| Comparative Example 1 | 20 | Poor |
| Example 1 | 35 | Poor |
| Example 2 | 48.3 | Poor |
| Example 3 | 60.5 | Good |
| Example 4 | 79.2 | Very good |
| Example 5 | 82.9 | Very good |
| Example 6 | 76.2 | Very good |
| Example 7 | 77.3 | Very good |
| Example 8 | 69.3 | Very good |
| Example 9 | 64.3 | Good |
| Comparative Example 2 | 40 | Poor |
| Comparative Example 3 | 46 | Poor |

A graph showing the dot size versus the weight ratio of calcium carbonate to PVC for comparative example 1 and examples 1-9 is shown in FIG. 3.

The present application is based on and claims priority of United Kingdom Priority Application No. 1821085.6 filed on Dec. 21, 2018, the entire contents of which are hereby incorporated herein by reference.

The invention claimed is:

1. A method for printing onto a substrate, comprising:
   applying a dispersion of polymer particles in a liquid plasticizer directly onto a substrate to form a polymer layer, wherein the polymer is selected from the group consisting of one or more of polyvinyl chloride, a copolymer of vinyl chloride and vinyl acetate, and a terpolymer of vinyl chloride, vinyl acetate and ethylene;
   printing an ink directly onto the polymer layer to form a printed polymer layer, wherein the ink comprises a colorant and thereby the printed polymer layer comprises the colorant; and
   curing the printed polymer layer to change the printed polymer layer from liquid to solid;
   wherein the dispersion of polymer particles in a liquid plasticizer comprises calcium carbonate, such that the weight ratio of calcium carbonate to polymer is in the range of 0.1 to 3.5.

2. A method according to claim 1, wherein the plasticizer is an ester-based plasticizer.

3. A method according to claim 2, wherein the ester-based plasticizer is a phthalate-based plasticizer chosen from one or more of dibutyl phthalate, dinonyl phthalate, dioctyl phthalate, dodecyl phthalate, diisodecyl phthalate, diisononyl phthalate, ditridecyl phthalate, and n-hexyl-n-decyl phthalate.

4. A method according to claim 1, wherein the polymer is polyvinyl chloride.

5. A method according to claim 1, wherein the weight ratio of calcium carbonate to polymer in the printed polymer layer is in the range of 0.4 to 1.5.

6. A method according to claim 1, wherein the substrate is a fleece-backed paper.

7. A method according to claim 1, wherein the printed polymer layer has a dot size of between 30 μm and 85 μm.

8. A method according to claim 1, wherein the printed polymer layer is cured by heating to a temperature in the range of 120 to 200° C.

9. A method according to claim 1, wherein the ink is an oil-based ink.

10. A method according to claim 9, wherein the ink comprises the colorant and an ester oil chosen from one or more of phthalic acid esters, sebacic acid esters, citric acid esters, azelaic acid esters, lauric acid esters, myristic acid esters, palmitic acid esters, octanoic acid esters and isononanoic esters.

11. A method according to claim 1, wherein the ink is printed onto the polymer layer by inkjet printing.

12. A printed substrate formed by the method according to claim 1.

13. A method according to claim 1, wherein the printed polymer layer does not contain a blowing agent.

* * * * *